United States Patent
Curzi

(10) Patent No.: US 7,899,874 B2
(45) Date of Patent: Mar. 1, 2011

(54) EMAIL SYSTEM FOR SENDING MESSAGES TO MULTIPLE GROUPS

(75) Inventor: Francesca Curzi, Rome (IT)

(73) Assignee: International Business Machines Corporation, Armonk, NY (US)

(*) Notice: Subject to any disclaimer, the term of this patent is extended or adjusted under 35 U.S.C. 154(b) by 197 days.

(21) Appl. No.: 12/173,819

(22) Filed: Jul. 16, 2008

(65) Prior Publication Data
US 2009/0094338 A1  Apr. 9, 2009

(30) Foreign Application Priority Data
Oct. 8, 2007  (EP) .................. 07118036

(51) Int. Cl.
*G06F 15/16* (2006.01)
(52) U.S. Cl. .................................... 709/206
(58) Field of Classification Search ......... 709/245, 709/238, 229, 228, 227, 207, 206, 205, 223, 709/219, 204, 203, 201, 232, 231, 230, 225; 726/6, 24, 22, 11, 1, 9, 28, 26; 713/189, 713/188, 186, 176, 168, 167, 156
See application file for complete search history.

(56) References Cited

U.S. PATENT DOCUMENTS

| | | | |
|---|---|---|---|
| 6,851,049 B1 * | 2/2005 | Price, III | 713/150 |
| 7,293,171 B2 * | 11/2007 | Batthish et al. | 713/152 |
| 2003/0088824 A1 * | 5/2003 | Ayan | 715/500 |
| 2007/0130464 A1 * | 6/2007 | Swedor et al. | 713/170 |

OTHER PUBLICATIONS

Send Personally 1.16.4, Sep. 25, 2008, http://shareme.com/details/send-personally.html.

* cited by examiner

*Primary Examiner*—Wing F Chan
*Assistant Examiner*—Charles Murphy
(74) *Attorney, Agent, or Firm*—Nelson and Nelson; Daniel P. Nelson; Alexis V. Nelson

(57) ABSTRACT

A method, apparatus, and computer program product for transmitting an email message to multiple groups of recipients is disclosed herein. In selected embodiments, a method may include composing an email message including digitally encoded content and email addresses associated with a first group of intended recipients. The method may further include adding, in response to a user request, email addresses associated with a second group of intended recipients. The email message may then be sent to the first and second groups of intended recipients. The method may further include preventing the first group of intended recipients from determining the identities of the second group of intended recipients, and preventing the second group of intended recipients from determining the identities of the first group of intended recipients.

11 Claims, 3 Drawing Sheets

US 7,899,874 B2

EMAIL SYSTEM FOR SENDING MESSAGES TO MULTIPLE GROUPS

BACKGROUND

Related Applications

This application claims priority to European Patent Application No. EP07118036 filed on Oct. 8, 2007, and entitled "Method and System for Sending Electronic Mail Messages to Multiple Groups."

DESCRIPTION OF THE RELATED ART

Privacy in electronic message communications is an increasingly important issue. Privacy may include protecting the identities of users as well as their electronic addresses and messages from unwanted disclosure. An electronic mail (email) system typically includes a user agent and a message transfer agent. A user agent is typically a program (sometimes called an email client) which accepts a variety of commands for composing, receiving and replying to messages, as well as for manipulating mailboxes. For example, an email client may show a list of messages in a user's mailbox by displaying message headers (which, inter alia, may identify the sender and subject of the email). An email client may also allow a user to create new messages by providing email addresses of recipients and content to be included in the messages.

Message transfer agents typically perform tasks associated with relaying messages from a source to a specified recipient. For example, the Simple Mail Transfer Protocol (SMTP) allows a user to specify one or more recipients of a message and then transmit the message to the recipients. The Post Office Protocol (POP3) or Internet Mail Access Protocol (IMAP) may handle any such incoming messages. In general, sending an email may include: (1) a message transfer agent connecting to a user's SMTP server and advising it of the addresses of the sender and recipient, together with the body of the message; (2) the user's SMTP server determining the IP address of the recipient's SMTP server (from the domain name included in the recipient's address); (3) the user's SMTP server connecting to the recipient's SMTP server, which forwards the message to its POP3 server; and (4) the recipient's POP3 server putting the message into the recipient's mailbox.

In some situations, a user may need to send an email to a group of recipients. Commercially available email systems may provide an option to send an email to multiple recipients. In some systems, it may be possible to predefine groups of recipients to avoid the need to gather addresses for each recipient each time an email is sent to the group.

Another desired feature may be to withhold information about the list of recipients and their email addresses from other recipients. For this purpose, commercial email systems may provide the option of "blind copying" some of the addressees (normally indicated with "bcc:"). Thus, addresses entered into the "bcc:" address field will not be shown to other recipients. When a sender does not want any of the recipients' identities or email addresses to be known, all recipients' addresses may be placed in this field.

However this solution does not solve the problem of sharing the identity of recipients within a limited group of recipients, without disclosing the information outside the group. For example, if a user desires to send an email message to multiple clients, where each client has multiple employees, but prefers not to disclose recipients' email addresses and identities outside each client (group), the user would need to send the same message several times (once to each client), with an undesired loss of time and efficiency.

SUMMARY

Consistent with the foregoing, a method for transmitting an email message to multiple groups of recipients is disclosed herein. In selected embodiments, such a method may include composing an email message including digitally encoded content and email addresses associated with a first group of intended recipients. The method may further include adding, in response to a user request, email addresses associated with a second group of intended recipients. The email message may then be sent to the first and second groups of intended recipients. The method may further include preventing the first group of intended recipients from determining the identities of the second group of intended recipients, and preventing the second group of intended recipients from determining the identities of the first group of intended recipients.

A corresponding apparatus and computer program product for implementing a method like the above-stated method are also disclosed and claimed herein.

BRIEF DESCRIPTION OF THE DRAWINGS

In order that the advantages of the various embodiments of the invention will be readily understood, a more particular description of the embodiments of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the various embodiments of invention, as generally described and illustrated in the Figures herein, could be arranged and designed in a wide variety of different configurations. Thus, the following more detailed description of the embodiments of the invention, as represented in the Figures, is not intended to limit the scope, but is merely representative of certain examples of embodiments. The presently described embodiments will be best understood by reference to the drawings, wherein like parts are designated by like numerals throughout.

Figure 1:
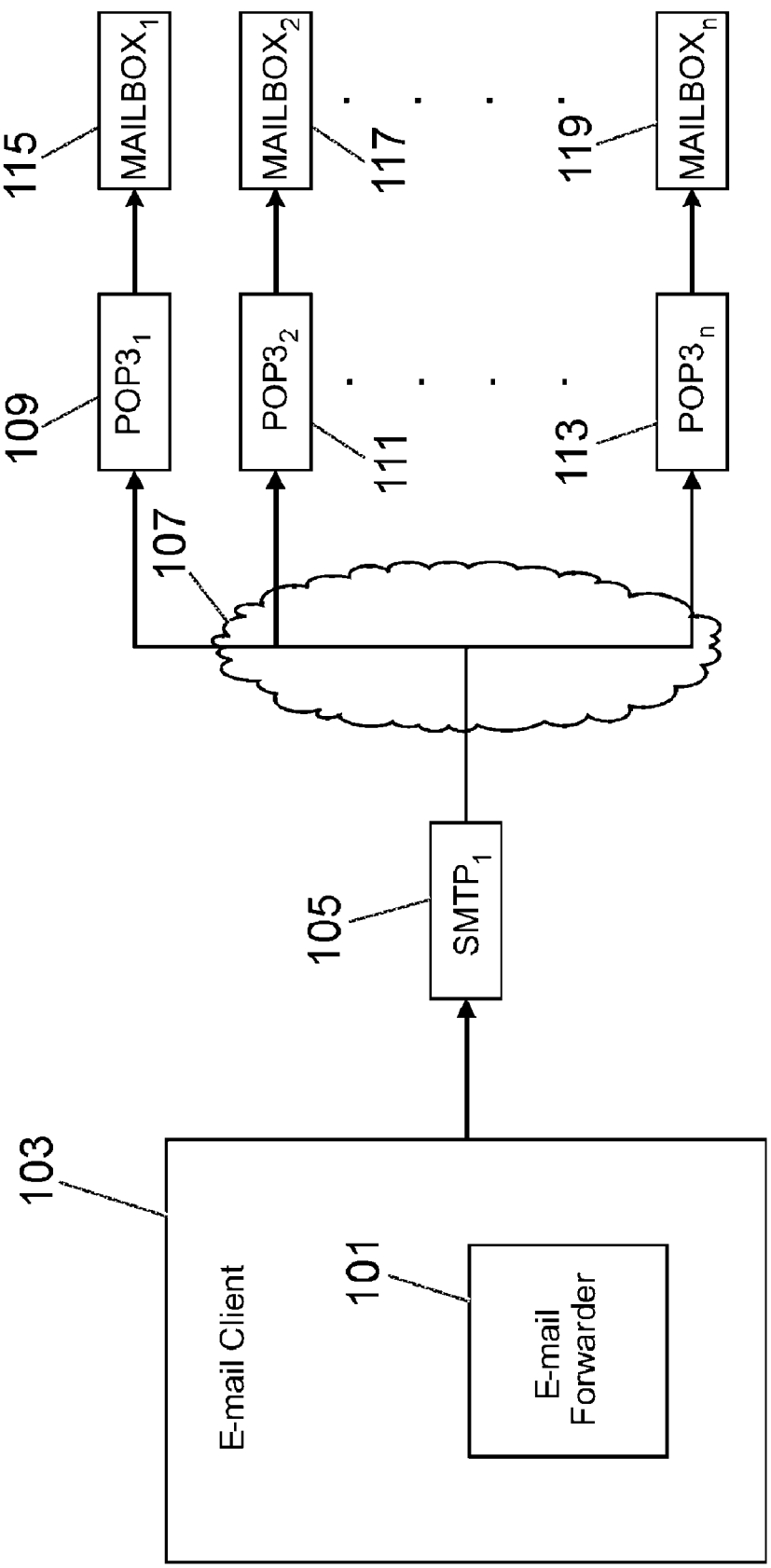
FIG. 1 is a high-level block diagram of one embodiment of an email exchange system that includes an email forwarding program for sending messages to multiple groups.

Referring to FIG. 1, an email forwarding program 101 according to one embodiment of the invention may be a stand-alone program or may be a module incorporated into an email client. Regardless of the format, however, the email forwarding program 101 may be integrable with an email client 103. In selected embodiments, the email forwarding program 101 and associated email client 103 may be connectable to an SMTP server 105, which may in turn be connectable (through the Internet or other suitable network 107) to one or more POP3, IMAP, or other suitable email receiving servers 109, 111, 113. The email receiving servers 109, 111, 113 may in turn be connectable to one or more mailboxes 115, 117, 119.

In operation, the email forwarding program 101 may interact with the email client 103 to compose emails for transmission to specified recipients. A more detailed explanation of the operation of the email forwarding program 101 will be explained hereafter. The composed emails may be transmitted by the email client 103 and/or the email forwarding program 101 to an associated SMTP server 105. Upon identifying the IP addresses corresponding with the domain names specified in the composed emails, the SMTP server 105 may transmit the email message text to the appropriate email receiving servers 109, 111, 113. The email receiving servers 109, 111, 113 may then transmit the composed emails to the mailboxes 115, 117, 119 of the specified recipients. These recipients may use their own email clients (not shown) to view the emails.

Figure 2:
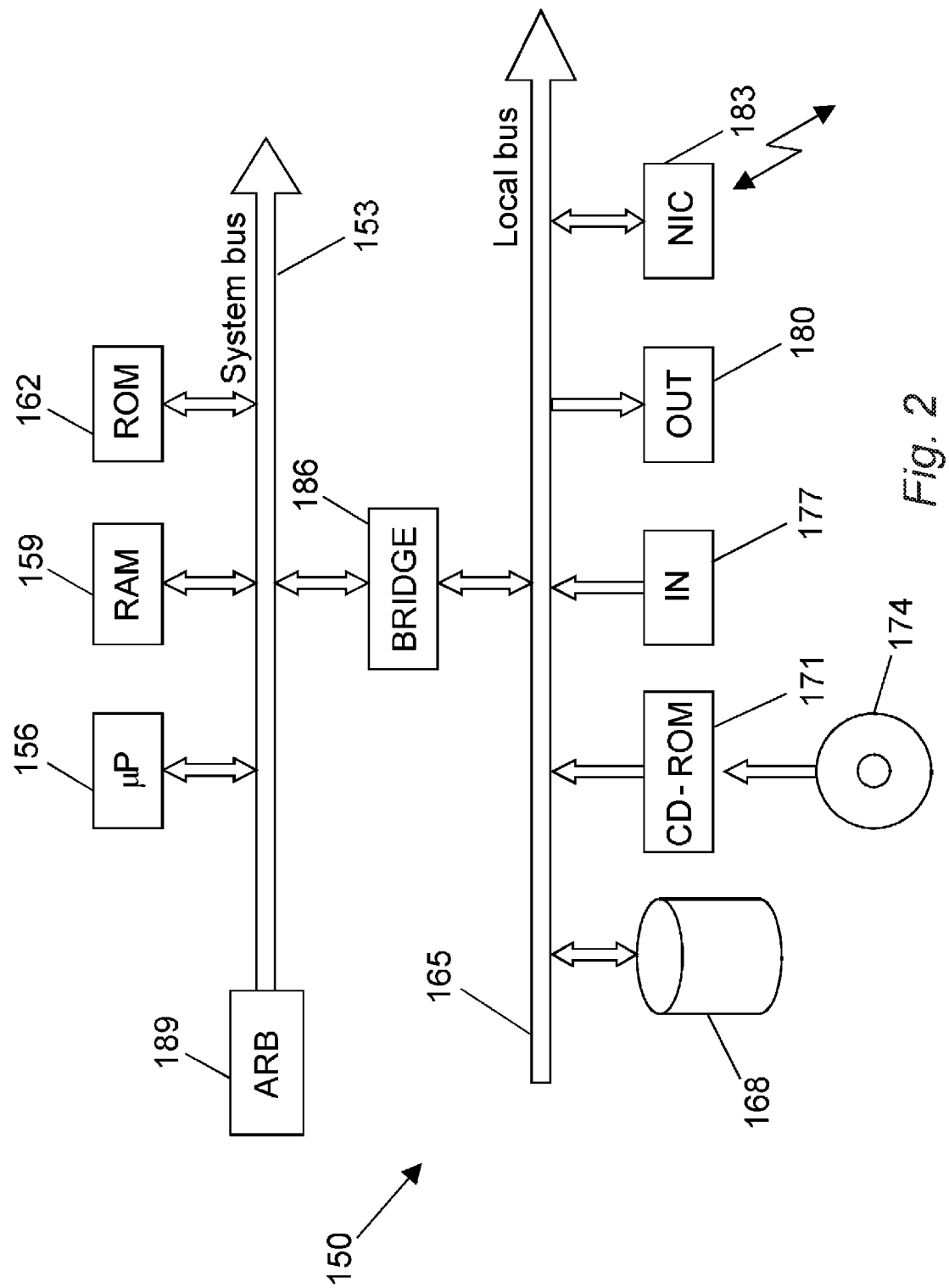
FIG. 2 is a high-level block diagram of one embodiment of a data processing system for implementing the method of FIG. 3.

Referring to FIG. 2, one embodiment of a computer system 150 (e.g., a mobile computing device, personal computer, laptop, personal digital assistant, server, or the like) for implementing an apparatus and method. The computer system 150 is provided only by way of example and is not intended to be limiting. In selected embodiments, a computer system 150 may include various units or components that communicate over a system bus 153. For example, one or more microprocessors 156 may control the operation of the computer system 150. A random access memory 159 may be used as a working memory for the microprocessor(s) 156. A read-only memory 162 may store basic code for booting the computer 150.

The computer system 150 may include various peripheral components that may communicate over a local bus 165 by means of respective interfaces. Such components may include, for example, a hard disk 168, a drive 171 for reading CD-ROMs 174, or other computer-readable media. The computer system 150 may also include input devices 177 (e.g., a keyboard, mouse, or the like) and output devices 180 (e.g., a monitor, printer, or the like). A network interface card (NIC) 183 may connect the computer 150 to a network. The system bus 153 may interface with the local bus 165 by way of a bridge unit 186. In selected embodiments, the microprocessor(s) 156 and the bridge unit 186 may operate as master agents to request access to the system bus 153. An arbiter 189 may manage the grant of access with mutual exclusion to the system bus 153. Similar considerations may apply if the system has a different topology, or it is based on other networks. Alternatively, the computer system 150 may have a different structure, include equivalent units, or consist of other data processing entities (such as PDAs, mobile phones, or the like).

In selected embodiments, an email forwarding program 101 according to one embodiment of the invention may allow a user to transmit a single email to multiple groups of one or more recipients. This can be accomplished without duplicating the composition and/or transmission of the email, and without disclosing the recipients' identities and/or email addresses to recipients of other groups. In certain embodiments, the email forwarding program 101 may be implemented by an email client, which may provide an "add separate group" button or option to an email composing system. When a user selects the new button or option, an additional header area may be provided in a user interface of the email composing system. Additional recipients may be specified by the user and inserted into the additional header area. If a user chooses not to use the new button or option, the email may be sent in the conventional manner.

In certain embodiments, upon activating the "add separate group" functionality, a second "to:" field may be generated. The user can enter the addresses of another group of recipients in this second "to:" field. Upon receiving the email, the recipients of the first group may be able to see the identities and email addresses of all recipient of the first group, but may not be allowed to see the identities and email addresses of recipients of the second group. This functionality may be extended for additional groups of recipients as needed. In this way, the privacy of the communication is maintained outside of each group. At the same time, the effort and time necessary to prepare and send the email message to several groups is minimized. In selected embodiments, each recipient may be able to reply to all email addresses of his/her own group, while being prevented from replying to email addresses associated with other groups.

In certain embodiments, the email forwarding program 101 may not limit the number of "add separate group" operations that can be performed on an email. Once the first, second and/or additional groups of recipients are indicated by the user, the email may be sent to the recipients associated with each group. The recipients of the first group may not receive any indication that the email was transmitted to other groups. In this way, the efficiency of the system may be enhanced and the number of operations required to send an email to different groups may be reduced.

Figure 3:
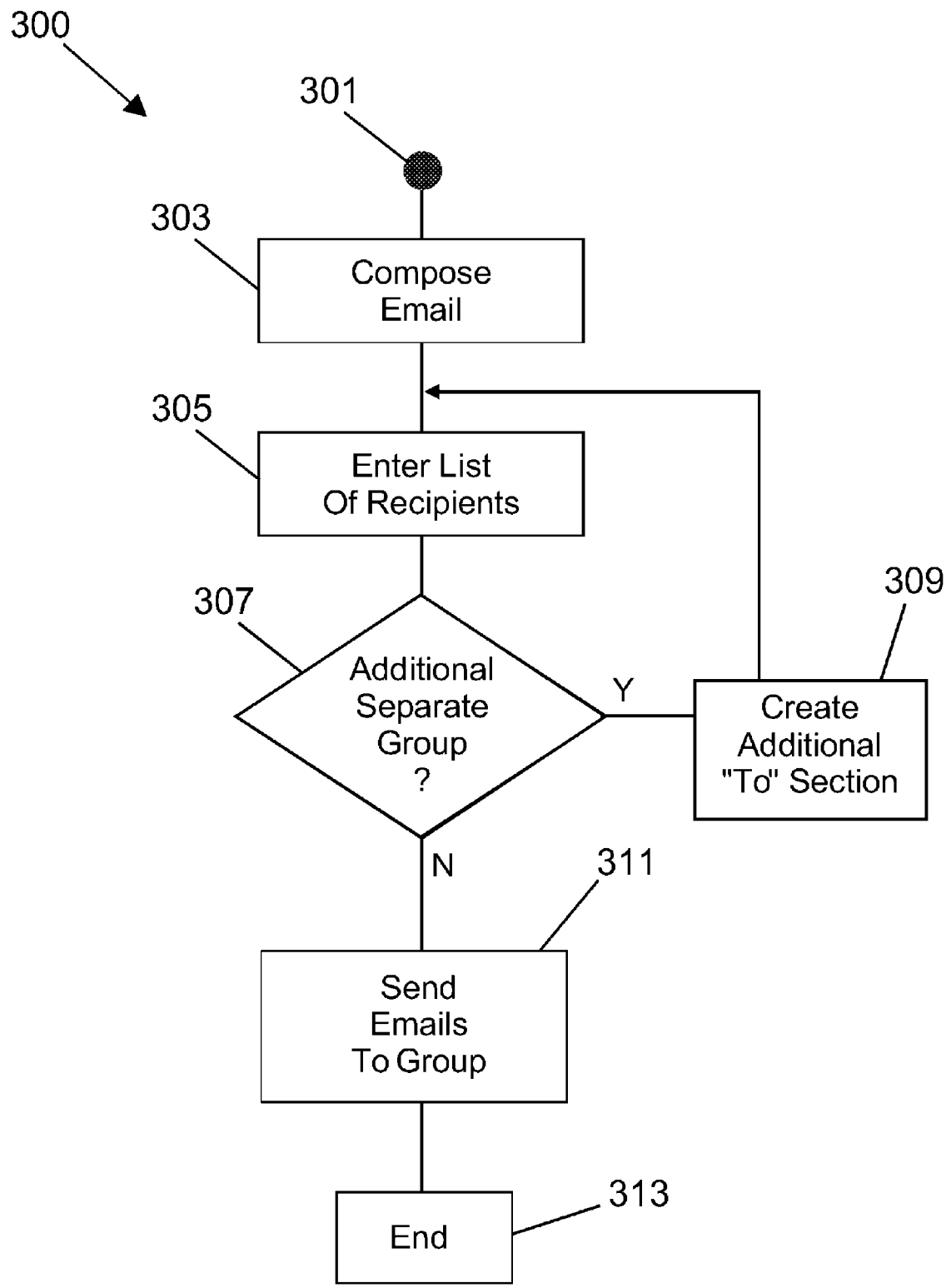
FIG. 3 is a flowchart showing one embodiment of a method for sending messages to multiple groups.

Referring to FIG. 3, a flowchart showing one embodiment of a method 300 for transmitting messages to multiple groups is illustrated. The method 300 may begin at a black start circle 301. A user may initially compose 303 the email content (e.g., text, drawings, or the like) and enter 305 the addresses of one or more intended recipients to which the email is to be transmitted. At this point, the user may have the option to designate 307 an additional group. If such an option is selected, a new "to:" section may be created 309 in the email composing interface. The process 300 may then proceed back to step 305 where the user can enter 305 one or more additional email addresses. When the user does not wish to add 307 additional groups, the email may be sent 311 to the various groups. The emails received by each group may show only the identities and email addresses of recipients belonging to the same group. The process 300 may then end 313.

Embodiments of the invention may take the form of an entirely hardware embodiment, an entirely software embodiment, or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system, (or apparatus or device) or a propagation medium. Examples of computer-readable medium may include a semiconductor or solid state memory, magnetic tape, a removable computer diskette, a random access memory (RAM), a read-only memory (ROM), a rigid magnetic disk, an optical disk, or the like. Current examples of optical disks include compact disk read-only-memory (CD-ROM), compact disk read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to be coupled to and communicate with other data processing systems or remote printers or storage devices through intervening private or public networks. Modems, cable modems, and Ethernet cards are just a few of the currently available types of network adapters.

Embodiments of the invention may take on other specific forms without departing from their spirit or essential characteristics. The described embodiments are to be considered in all respects only as illustrative and not restrictive. All changes which come within the meaning and range of equivalency of the claims are to be embraced within their scope.

The invention claimed is:

1. A method for transmitting an email message to multiple groups of recipients, the method comprising:
    composing an email message including digitally encoded content, email addresses associated with a first group of intended recipients, and email addresses associated with a second group of intended recipients;
    entering the email addresses associated with the first group of intended recipients into a first "to:" field;
    entering the email addresses associated with the second group of intended recipients into a second "to:" field;
    sending the email message to the first and second groups of intended recipients;
    preventing the first group of intended recipients from determining the identities of the second group of intended recipients, and preventing the second group of intended recipients from determining the identities of the first group of intended recipients; and
    enabling the intended recipients of the first group to know the identities of intended recipients within the first group, and enabling the intended recipients of the second group to know the identities of intended recipients within the second group.

2. The method of claim 1, further comprising:
    concealing, from the intended recipients of the first group, the fact that the email message has been sent to the intended recipients of the second group; and
    concealing, from the intended recipients of the second group, the fact that the email message has been sent to the intended recipients of the first group.

3. The method of claim 1, further comprising:
    enabling the intended recipients of the first group to know that the email message has been sent to intended recipients of the first group; and
    enabling the intended recipients of the second group to know that the email message has been sent to intended recipients of the second group.

4. A computer program product for transmitting an email message to multiple groups of recipients, the computer program product comprising:
    a non-transitory computer-readable storage medium including instructions embodied therein, wherein the instructions are executable by a processor to:
        compose an email message including digitally encoded content, wherein an email composing interface associated with the email message includes a first "to:" field for entering email addresses associated with a first group of intended recipients and a second "to:" field for entering email addresses associated with a second group of intended recipients;
        enter the email addresses associated with the first group of intended recipients into the first "to:" field and enter the email addresses associated with the second group of intended recipients into the second "to:" field;
        send the email message to the first and second groups of intended recipients;
        prevent the first group of intended recipients from determining the identities of the second group of intended recipients, and prevent the second group of intended recipients from determining the identities of the first group of intended recipients; and
        enable the intended recipients of the first group to know the identities of intended recipients within the first group, and enable the intended recipients of the second group to know the identities of intended recipients within the second group.

5. The computer program product of claim 4, wherein the non-transitory computer-readable storage medium further includes instructions to:
    conceal, from the intended recipients of the first group, the fact that the email message has been sent to the intended recipients of the second group; and
    conceal, from the intended recipients of the second group, the fact that the email message has been sent to the intended recipients of the first group.

6. The computer program product of claim 4, wherein the non-transitory computer-readable storage medium further includes instructions to:
    enable the intended recipients of the first group to know that the email message has been sent to intended recipients of the first group; and
    enable the intended recipients of the second group to know that the email message has been sent to intended recipients of the second group.

7. The computer program product of claim 4, wherein the computer program product is integrated with an email client.

8. The computer program product of claim 4, wherein the computer program product is a stand-alone product.

9. An apparatus for transmitting an email message to multiple groups of recipients, the apparatus comprising:
    a computer programmed with an email client to:
        compose an email message including digitally encoded content, wherein an email composing interface associated with the email message includes a first "to:" field for entering email addresses associated with a first group of intended recipients and a second "to:" field for entering email addresses associated with a second group of intended recipients;
        enter the email addresses associated with the first group of intended recipients into the first "to:" field and enter the email addresses associated with the second group of intended recipients into the second "to:" field;
        send the email message to the first and second groups of intended recipients;
        prevent the first group of intended recipients from determining the identities of the second group of intended recipients, and prevent the second group of intended recipients from determining the identities of the first group of intended recipients; and enable the intended recipients of the first group to know the identities of intended recipients within the first group, and enable the intended recipients of the second group to know the identities of intended recipients within the second group.

10. The apparatus of claim 9, wherein the email client further:

conceals, from the intended recipients of the first group, the fact that the email message has been sent to the intended recipients of the second group; and conceals, from the intended recipients of the second group, the fact that the email message has been sent to the intended recipients of the first group.

11. The apparatus of claim 10, wherein the email client further:

enables the intended recipients of the first group to know that the email message has been sent to intended recipients of the first group; and enables the intended recipients of the second group to know that the email message has been sent to intended recipients of the second group.

* * * * *